O. BILLINGS.
Harvesters.
No. 5,538. Reissued August 19, 1873.
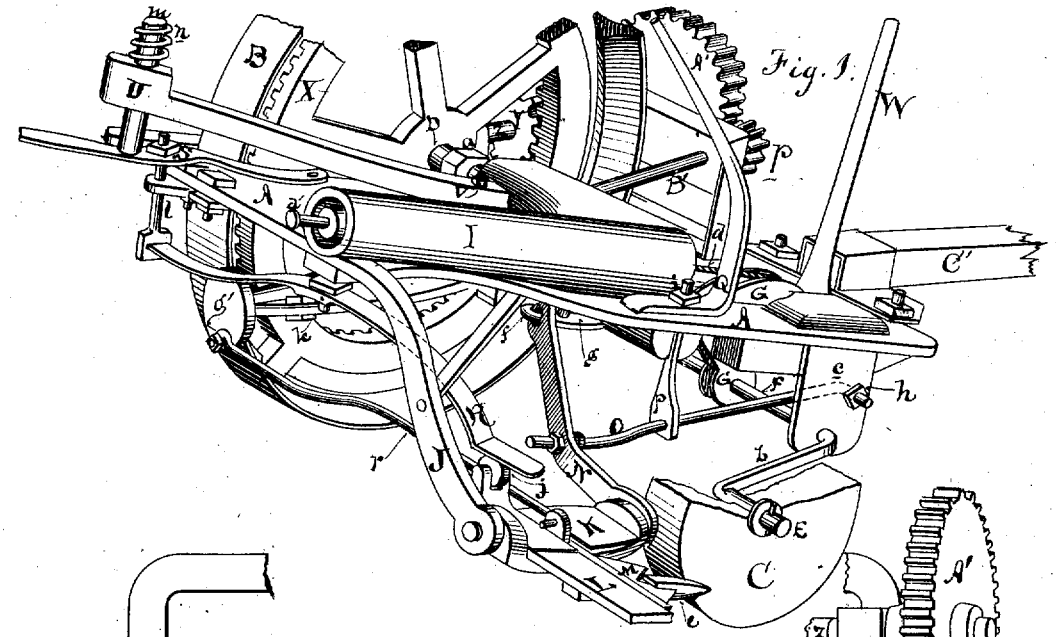
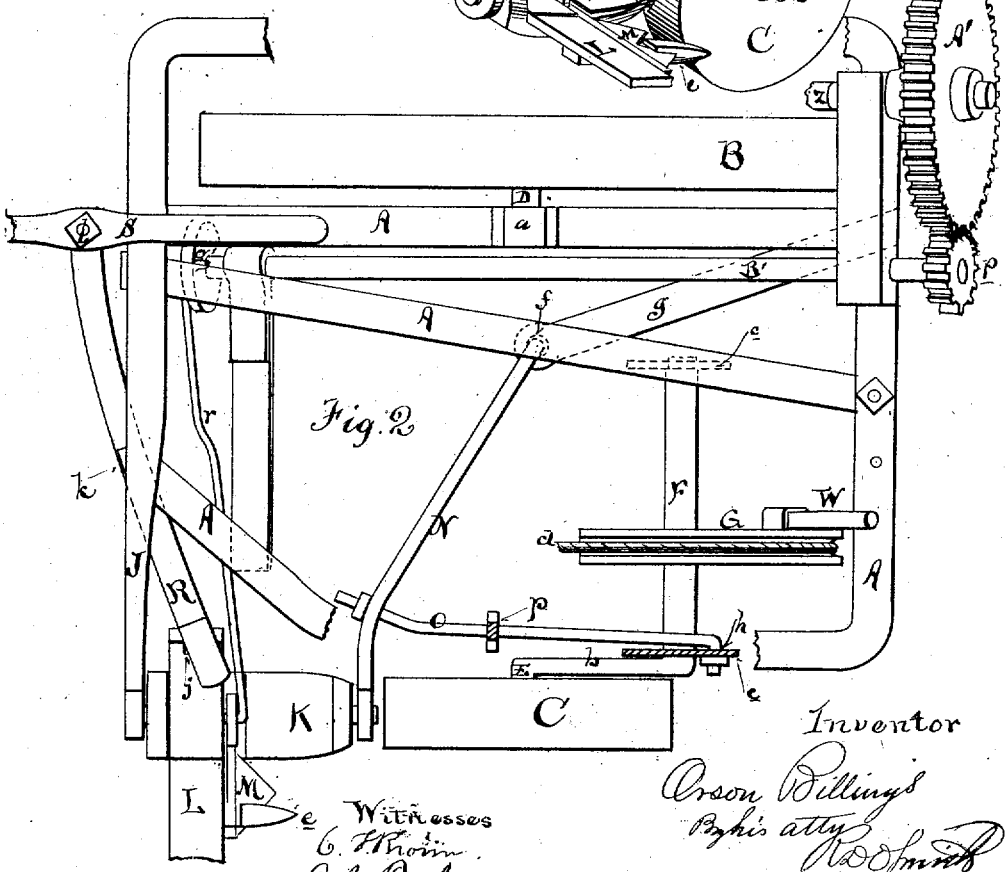
Witnesses
C. H. Thoin
C. J. Tasker.
Inventor
Orson Billings
By his atty
R. D. Smith
THE HORRIS PETERS CO., PHOTO-LITHO., WASHINGTON, D. C.

O. BILLINGS.
Harvesters.

No. 5,538. Reissued August 19, 1873.

Witnesses.
C. F. Brown.
C. J. Tasker.

Inventor
Orson Billings
By his Atty R. D. Smith

THE NORRIS PETERS CO., PHOTO-LITHO., WASHINGTON, D. C.

O. BILLINGS.
Harvesters.

No. 5,538. Reissued August 19, 1873.

Witnesses.
C. F. Tasker
C. J. Tasker

Inventor.
Orson Billings
By his atty
R. D. Smith

THE NORRIS PETERS CO., PHOTO-LITHO., WASHINGTON, D. C.

4 Sheets--Sheet 4.

O. BILLINGS.
Harvesters.

No. 5,538. Reissued August 19, 1873.

Witnesses.
C. F. Brown
C. J. Tasker.

Inventor
Orson Billings
By his atty
R. D. Smith

THE NORRIS PETERS CO., PHOTO-LITHO., WASHINGTON, D. C.

UNITED STATES PATENT OFFICE.

ORSON BILLINGS, OF ELYRIA, OHIO.

IMPROVEMENT IN HARVESTERS.

Specification forming part of Letters Patent No. 33,691, dated November 12, 1861; reissue No. 5,538, dated August 19, 1873; application filed May 7, 1873.

*To all whom it may concern:*

Be it known that I, ORSON BILLINGS, formerly of La Grange, in the county of Lorain and State of Ohio, now of Elyria, in same county and State, have invented a new and useful Improvement in Grain and Grass Harvesters; and I do hereby declare the following to be a full, clear, and exact description of the same, reference being had to the accompanying drawings, in which—

Figure 3:
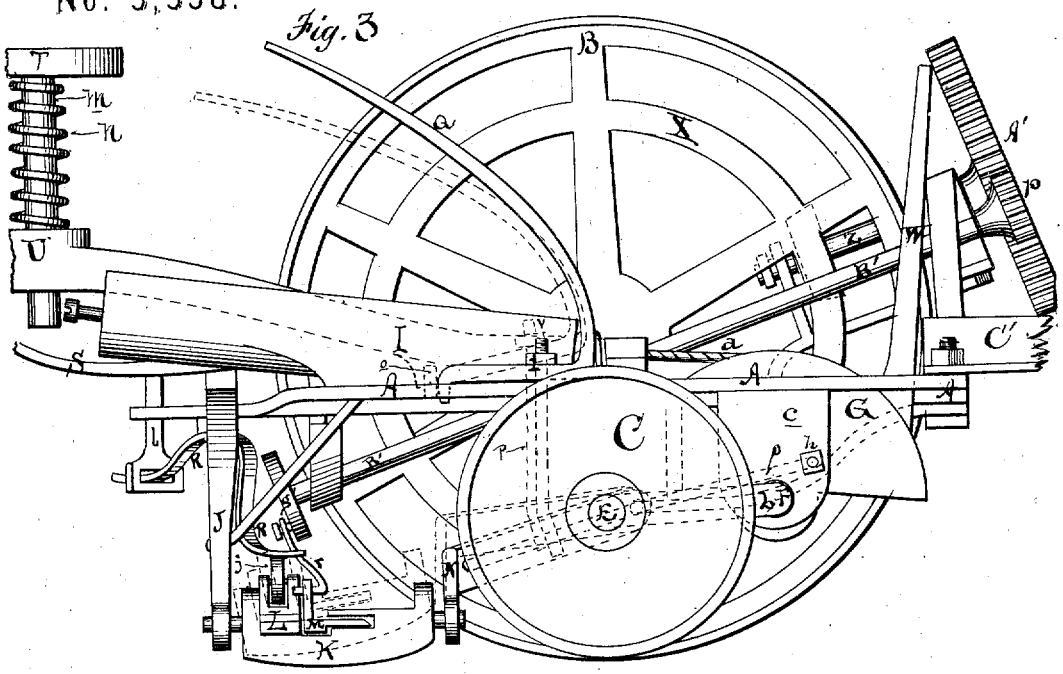
Figure 4:
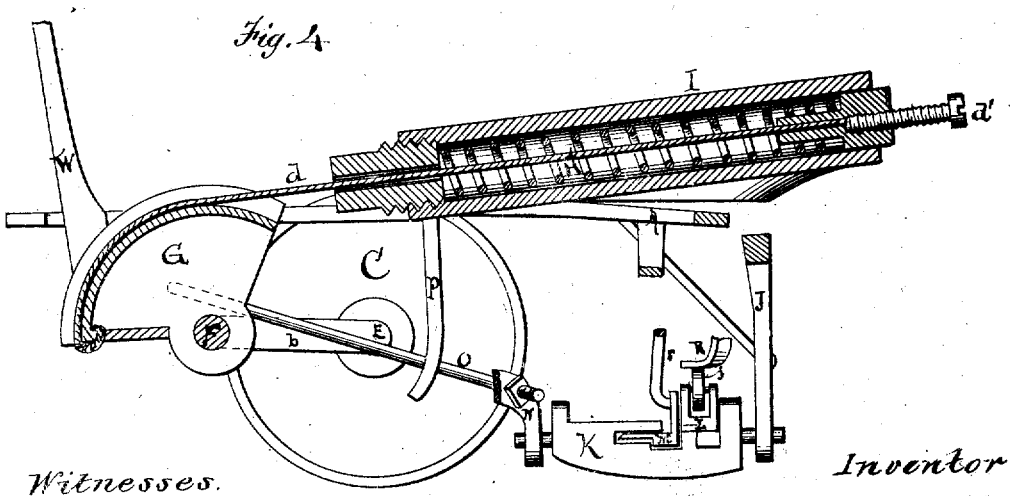
Figure 5:
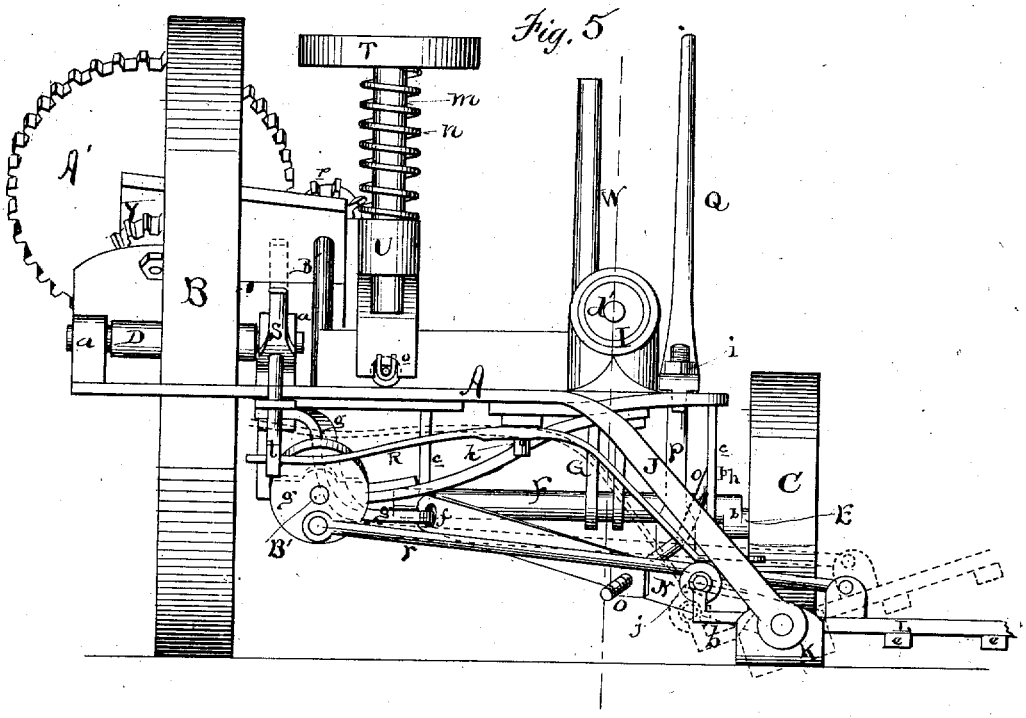
Figure 6:
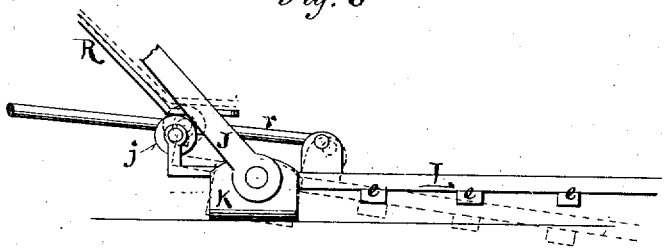
Figure 7:
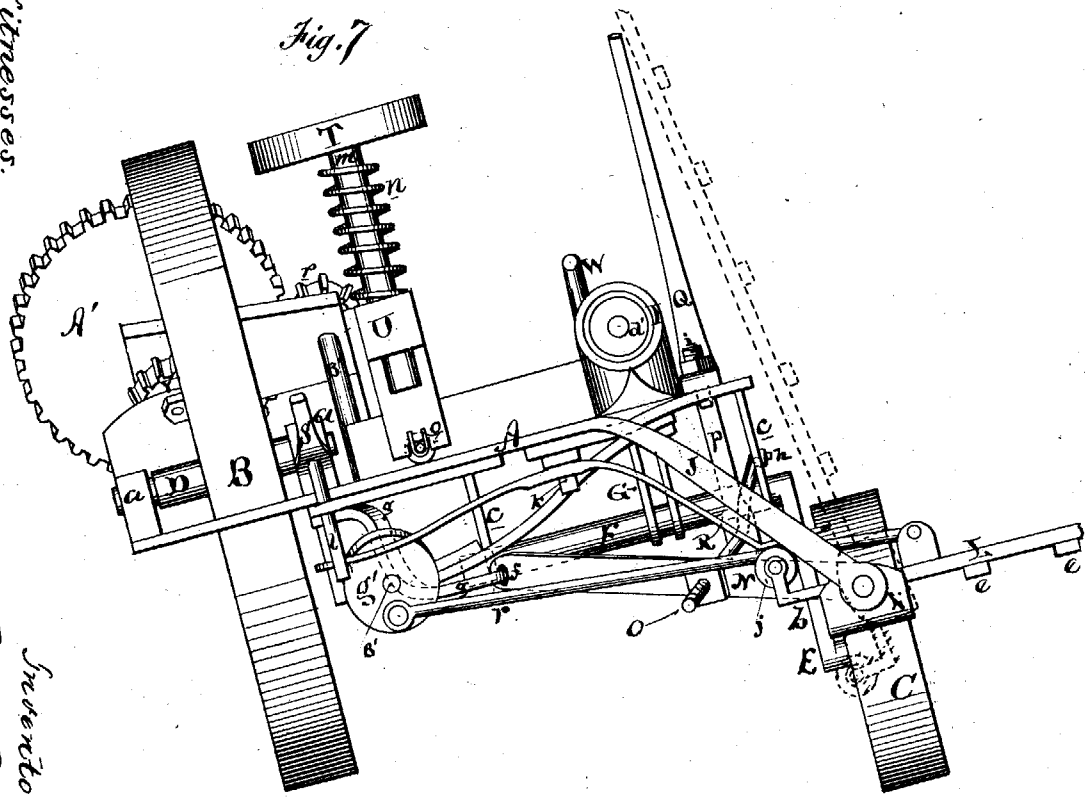

Figure 1 is a perspective view of a part of my machine, portions being broken away to exhibit the construction. Fig. 2 is a plan of the frame and its flexible attachments. Fig. 3 is a side elevation. Fig. 4 is a sectional elevation of device for balancing the pressure upon the inner wheel. Fig. 5 is a rear elevation. Fig. 6 is a rear elevation of the cutting apparatus and its connections. Fig. 7 is a rear elevation, showing the position of the parts when the cutting apparatus is elevated from the ground.

Machines have been made heretofore with the points of cutters and guards adjustable up and down, by sliding the front end of the drag-bar or shoe up or down in a retaining groove or slot, and the power required to so adjust the points of the cutters has been augmented by friction in said groove or slot resulting from side draft.

The object of my invention is to enable the points of the cutters during the advance of the machine to raise above or descend below their plane of advance without additional resistance from friction resulting from the resistance of the cutting apparatus, either as to advance or side draft, and also to enable the driver, while riding upon his seat and during the advance of the machine, to control at will the position of the points of the cutters in respect to their plane of advance; and also to balance the cutting apparatus, so that it will run with little pressure upon the ground; and it therefore consists, first, in a cutting apparatus attached at its inner end to a shoe jointed to and supported by a lateral brace, which is independently jointed to the main frame, and a lever connected with said brace, whereby the points of the fingers and cutters may be capable of free adjustment above or below their plane of advance; second, in a lateral brace jointed to and supporting the rear of the shoe, in connection with an independent lateral brace jointed to the front of said shoe and to the main frame to support the front end of said shoe, and permit the free adjustment of the points of the cutters and guards above or below their plane of advance; third, in a longitudinal brace connected with said independently-jointed brace, whereby it is restrained from movement other than up and down; fourth, in adjustable and movable spring and lever devices, whereby the cutting apparatus may be balanced so as to run with very little pressure upon the ground or be raised bodily above it.

To enable those skilled in the art to fully understand my invention, I will particularly describe the devices which I have employed in its practical operation.

A represents a frame, which has a driving-wheel, B, placed in one side of it, and a track-wheel, C, at its opposite side. The driving-wheel B is placed on an axle, D, which works in fixed or stationary bearings *a a*, while the track-wheel C has its arm or axle E at the end of crank *b*, which is at one end of a shaft, F, that is placed or fitted in suitable bearings *c* underneath the front part of the frame A. On the shaft F there is a segment, G, to which a cord or chain, *d*, is attached, and this cord or chain is connected to a spiral spring, H, which is fitted within a horizontal tube, I, on the frame A, the cord or chain being attached to a set-screw, *d'*, at the back end of the spring, and by adjusting this screw the tension of the spring H may be regulated as desired. To the under side of the back part of frame A there is attached a curved lateral brace-bar, J, the lower end of which serves as a bearing for the back journal of a shoe-plate, K, at the inner end of a finger-bar, L. This finger-bar may be of usual construction, and also the fingers *e*, which are attached to it. M is the sickle, which is of the ordinary reciprocating kind, and fitted on the fingers *e*. The front end of the shoe K has a journal fitted in the end of a brace-bar, N, which is attached at its inner end, by a joint, *f*, to a bracket, *g*, fixed underneath the frame A. The brace-bar N, near its outer end, is fitted on the back end of a longitudinal brace-rod, O, the front end of which is attached, by a joint, *h*, to the under side of the frame A. The rod O passes through a pendant, P, which extends up through the frame A, passes through the lower part of a lever, Q, and has a nut, *i*, upon it. By adjusting or turning the nut *i* the front part of the shoe K, and consequently the front part of the finger-bar and points of the sickle, may be more or less elevated, as circumstances may require. In case the front part of the sickle or fingers require to be temporarily raised, it may be done at any time by drawing down the upper end of the lever Q. The inner end of the finger-bar L has a friction-roller, *j*, applied or attached to it, and upon this roller the outer end of a spring, R, bears. This spring R partakes of the character of a lever, and has its fulcrum at *k*. The inner end of this spring R is connected by a link, *l*, with a lever, S, the rear end of which is within convenient reach of the driver, who is on his seat T. The seat T is simply a disk having a pendent rod or guide, *m*, attached, on which a spiral spring, *n*, is placed. The rod or guide *m* passes through the outer part of a bar, U, the front end of which is attached, by a bolt, V, to the frame A. The bar U is allowed to turn on this bolt V, and to facilitate the turning of said bar a friction-roller, *o*, is inserted in it, said roller resting on the frame A. The spring *n* allows the seat to yield or give readily; and in consequence of the arrangement of the bar U the driver is enabled to shift his position from right to left, as occasion may require. The segment G of shaft F has a lever, W, connected to it, by operating which the driver may at any time raise the right side of the main frame, and consequently the finger-bar and sickle, so that the latter may pass over obstructions which may lie in its path. The outer end of the finger-bar is, of course, allowed to rise and fall to conform to the inequalities of the surface of the ground, and the inner end of the finger-bar is allowed a similar movement in consequence of the arrangement of the track-wheel C on its crank-axle E. The spiral spring H, connected to the segment G by the cord or chain *d*, serves as a counterpoise and greatly facilitates the yielding movement of the finger-bar and sickle, and by regulating the tension of spring H the pressure of the finger-bar on the earth may be regulated as desired. The driving-wheel B has a concentric-toothed rim, X, at its outer side, which rim gears into a pinion, Y, on a shaft, Z. On the front end of this shaft Z there is placed a toothed wheel, A′, which gears into a pinion, *p*, said pinion being at the front end of a shaft, B′, which is fitted in the frame A at the inner or right-hand side of the wheel B. The back end of the shaft B′ is provided with a crank-pulley, *g*′, from which the sickle M is driven by a pitman, *r*.

This arrangement of the sickle-driving mechanism has a tendency to prevent side draft, as the power is taken from the driving-wheel at its left side, and consequently is as far to the left side of the draft-pole C′ as possible, and therefore serves to counteract the resistance offered by the grain or grass to the cutting action of the sickle. The spring R effects two important results—first, it serves to keep the outer part of the finger-bar and sickle elevated from or from bearing too heavily on the ground; and, second, it admits, when pressed down on the inner end of the finger-bar through the medium of lever S, of the finger-bar and sickle being raised bodily from the ground, when the lever W is drawn back.

When being removed from place to place, the cutting apparatus is folded, as shown by dotted lines in Fig. 7.

Having described my invention, what I claim as new is—

1. The front end of the shoe K of the finger-bar hinged to the adjustable brace-bar N, and combined with the pendant P and lever Q, as described, for the purpose of regulating the height of the front ends of the fingers *e*, as set forth.

2. A lateral brace jointed to and supporting the rear end of the shoe, combined with an independently-jointed lateral brace-bar supporting said shoe at its front end, so as to permit the points of the cutters to move above or below their plane of advance, as described.

3. A lateral brace jointed to and supporting the rear end of the shoe, combined with an independent lateral brace-bar jointed to the main frame and to the front end of said shoe, and a longitudinal brace to support said independent brace against longitudinal strains, substantially for the purpose set forth.

4. The arrangement of the spring-lever R, relatively with the lever S and finger-bar L, as shown and described, whereby the weight of the outer part of the finger-bar and sickle is counterbalanced, or nearly so, and whereby said finger-bar and sickle may be raised bodily, when required, in order to pass over obstructions.

5. The arrangement of the crank-axle E of the track-wheel C, segment G, and spring H, substantially as and for the purpose specified.

ORSON BILLINGS.

Witnesses:
C. H. DOOLITTLE,
FRED. S. REEFY.